United States Patent
Hsu et al.

(10) Patent No.: US 8,521,884 B2
(45) Date of Patent: Aug. 27, 2013

(54) NETWORK SYSTEM AND METHOD OF ADDRESS RESOLUTION

(75) Inventors: Ming-Chao Hsu, Hsinchu (TW); Shih-Yen Shuieh, Taipei County (TW); Tzi-Cker Chiueh, Taipei (TW); An-Nan Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 12/968,286

(22) Filed: Dec. 15, 2010

(65) Prior Publication Data

US 2012/0158997 A1 Jun. 21, 2012

(51) Int. Cl.
*G06F 15/173* (2006.01)

(52) U.S. Cl.
USPC .......... 709/226; 709/242; 709/241; 709/246; 705/62; 705/713; 705/455

(58) Field of Classification Search
USPC ............ 709/226, 242, 241, 246, 224; 725/62
See application file for complete search history.

(56) References Cited

U.S. PATENT DOCUMENTS

| | | | |
|---|---|---|---|
| 5,809,233 A * | 9/1998 | Shur | 709/230 |
| 6,112,248 A | 8/2000 | Maciel et al. | |
| 7,180,887 B1 | 2/2007 | Schwaderer et al. | |
| 7,415,028 B1 | 8/2008 | Allam | |
| 7,593,346 B2 | 9/2009 | McLaggan et al. | |
| 7,616,561 B1 * | 11/2009 | Liu et al. | 370/225 |
| 7,711,983 B2 | 5/2010 | Hatasaki et al. | |
| 7,751,329 B2 | 7/2010 | Lapuh et al. | |
| 8,098,648 B2 * | 1/2012 | Nakata et al. | 370/351 |
| 2006/0224886 A1 * | 10/2006 | Cohen et al. | 713/154 |
| 2009/0222548 A1 * | 9/2009 | Dommety et al. | 709/223 |
| 2010/0135155 A1 * | 6/2010 | Sankhavaram | 370/230 |
| 2010/0257269 A1 * | 10/2010 | Clark | 709/226 |
| 2011/0142053 A1 * | 6/2011 | Van Der Merwe et al. | 370/395.1 |

FOREIGN PATENT DOCUMENTS

TW I310265 5/2009

\* cited by examiner

*Primary Examiner* — David Lazaro
*Assistant Examiner* — Mahran Abu Roumi
(74) *Attorney, Agent, or Firm* — Jianq Chyun IP Office

(57) ABSTRACT

A network system and a method of address resolution are provided. The network system includes a network, a plurality of virtual machines, a routing module and a path directory module. Each virtual machine includes an internet protocol (IP) address and N media access control (MAC) addresses, so as to connect the network through N transmission routes. The routing module detects and calculates states of the transmission routes. The path directory module receives and decodes an address resolution protocol (ARP) request presented by at least one source virtual machine to reply path information, which includes N MAC addresses corresponding to an IP address of a destination virtual machine and states of the N transmission routes. Thus, the virtual machines present the ARP request without broadcast, so that the problem of network congestion is solved.

19 Claims, 7 Drawing Sheets

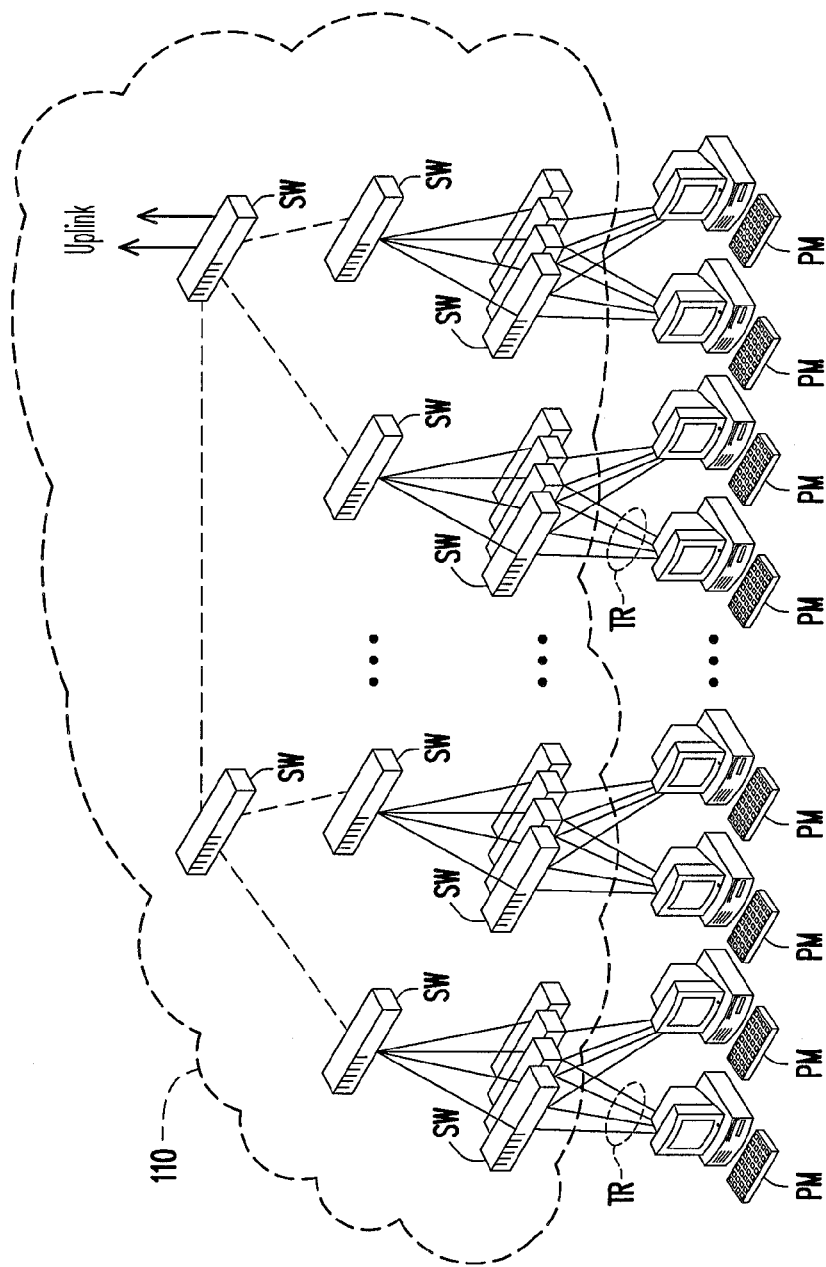
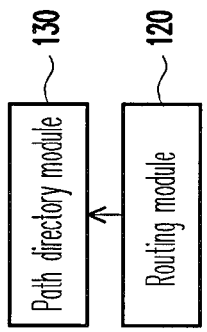
FIG. 1

Table (2)

| IP address | MAC address of transmission route 1 | states of transmission route 1 | MAC address of transmission route 2 | states of transmission route 2 | Timestamp |
|---|---|---|---|---|---|
| IP_2 | MAC_21 | T | MAC_22 | T | 3 |

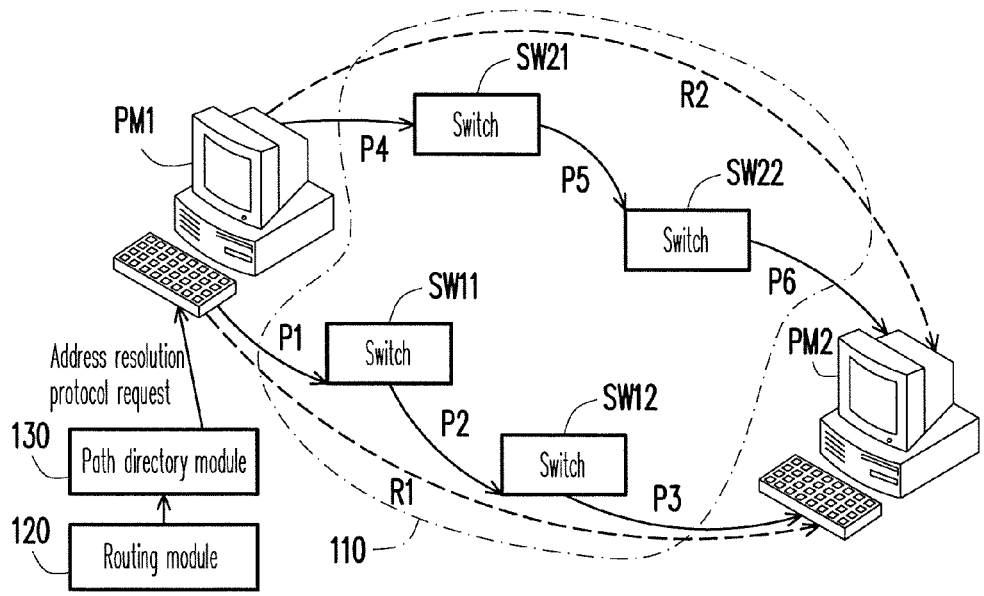

Table (3)

| IP address | MAC address of transmission route 1 | states of transmission route 1 | MAC address of transmission route 2 | states of transmission route 2 | PM identification code | Timestamp |
|---|---|---|---|---|---|---|
| IP_1 | MAC_11 | T | MAC_12 | T | | |
| IP_2 | MAC_21 | T | MAC_22 | T | PM1 | 3 |
| ... | ... | ... | ... | ... | ... | ... |

FIG. 4

Table (6)

| IP address | MAC address of transmission route 1 | states of transmission route 1 | MAC address of transmission route 2 | states of transmission route 2 | PM identification code | Timestamp | PM identification code | Timestamp | ... |
|---|---|---|---|---|---|---|---|---|---|
| IP_1 | MAC_11 | F | MAC_12 | T | PM3 | 10 | PM5 | 3 | ... |
| IP_2 | MAC_21 | F | MAC_22 | T | PM1 | 3 | PM2 | 1 | ... |
| ... | ... | ... | ... | ... | ... | ... | ... | ... | ... |

Table (7)

| IP address | MAC address of transmission route 1 | states of transmission route 1 | MAC address of transmission route 2 | states of transmission route 2 | PM identification code | Timestamp | ... |
|---|---|---|---|---|---|---|---|
| IP_1 | MAC_11 | F | MAC_12 | T | SW12 | 10 | ... |
| IP_2 | MAC_21 | F | MAC_22 | T | SW11 | 3 | ... |
| ... | ... | ... | ... | ... | ... | ... | ... |

FIG. 7

NETWORK SYSTEM AND METHOD OF ADDRESS RESOLUTION

BACKGROUND

1. Field of the Disclosure

The disclosure relates to a network system and method of address resolution.

2. Description of Related Art

In domains of network service and information transmission, many corporations (for example, companies, government agencies, and research institutions, etc.) respectively construct a plurality of physical servers (for example, network servers, search servers, and mail servers, etc.) to support their remote services (or referred to as cloud services), and set up one or a plurality of virtual machines (VM) on the servers to strengthen functions thereof. In order to carry operation loads of the remote services, many corporations use multiple servers and virtual local area network (VLAN) technique to share the operation loads, so that a number of the used servers is increased. Therefore, in order to reduce an operating cost, these servers can be centralized as a data center for central management, and application programs and hardware resources can be integrated to reduce a cost for managing the servers.

On the other hand, in an Ethernet protocol, when a source machine transmits a data packet, the source machine is required to broadcast an address resolution protocol (ARP) request within a network segment through the address resolution protocol, so as to inquire a media access control (MAC) address of a destination machine according to an Internet protocol (IP) address of the destination machine, and accordingly ensure a smooth transmission of the data packet.

However, a number of the servers in the same network segment of the data center can be tens of thousands, and if multiple machines simultaneously broadcast the ARP requests in the network segment, it may cause network congestion. Therefore, in the data center network, how to use the IP address of the destination machine for obtaining the corresponding MAC addresses while simultaneously avoiding the network congestion is an important issue to be developed.

SUMMARY OF THE DISCLOSURE

A network system is introduced herein, in which a path directory module is used to process address resolution protocol (ARP) requests of virtual machines in centralization, so as to implement a function of ARP and avoid network congestion, and when a currently used transmission route is interrupted or is excessively congested, the virtual machine can immediately use an alternate route, so as to continue data transmission without re-performing the address resolution operation.

On the other hand, a method of address resolution is introduced herein, by which a path directory module is used to process ARP requests of virtual machines in centralization, so as to implement a function of ARP and avoid network congestion, and when a currently used transmission route is interrupted or is excessively congested, the virtual machine can immediately use an alternate route, so as to continue data transmission without re-performing the address resolution operation.

The disclosure provides a network system including a network, a plurality of virtual machines, a routing module and a path directory module. Each of the virtual machines includes an Internet protocol (IP) address and N media access control (MAC) addresses, so as to connect the network through N transmission routes, wherein N is a positive integer and N>1. The routing module detects and calculates states of the transmission routes in the network system. The path directory module records the IP address and the N MAC addresses of each of the virtual machines and a calculation result of the routing module. The path directory module receives and decodes an address resolution protocol (ARP) request presented by at least one source virtual machine to reply path information. The path information includes N MAC addresses corresponding to the IP address of a destination virtual machine and states of the N transmission routes thereof.

In an exemplary embodiment of the disclosure, the path directory module transmits a timestamp to each of the at least one source virtual machine when replying the path information, so that when the timestamp becomes invalid, the source virtual machine removes the path information.

According to another aspect, the disclosure provides a method of address resolution, which can be described as follows. A plurality of virtual machines is set, wherein each of the virtual machines includes an Internet protocol (IP) address and N media access control (MAC) addresses, so as to connect a network through N transmission routes. Moreover, states of the transmission routes are detected. The IP address, the corresponding N MAC addresses of each of the virtual machines and the states of the transmission routes are recorded. An address resolution protocol (ARP) request presented by at least one source virtual machine is received and decoded to reply path information. The path information includes N MAC addresses corresponding to the IP address of a destination virtual machine and states of the N transmission routes thereof.

According to the above descriptions, the virtual machines can direct present the ARP requests to the path directory module without broadcasting the ARP requests within a network segment, so as to implement a function of the ARP and avoid the problem of network congestion. On the other hand, the path directory module can actively notify the virtual machine to update the states of the transmission routes within a valid time of the timestamp, so that the virtual machine can immediately use an alternate route when a currently used transmission route is interrupted or excessively congested, so as to continue data transmission without re-performing the address resolution operation.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 is a schematic diagram illustrating a network system according to a first exemplary embodiment of the disclosure.

FIG. 4 is a schematic diagram illustrating tables obtained after address resolution between a source virtual machine and a path directory module.

FIG. 7 a diagram illustrating path tables of a network system according to the second exemplary embodiment of the disclosure.

DETAILED DESCRIPTION OF DISCLOSED EMBODIMENTS

Figure 2:
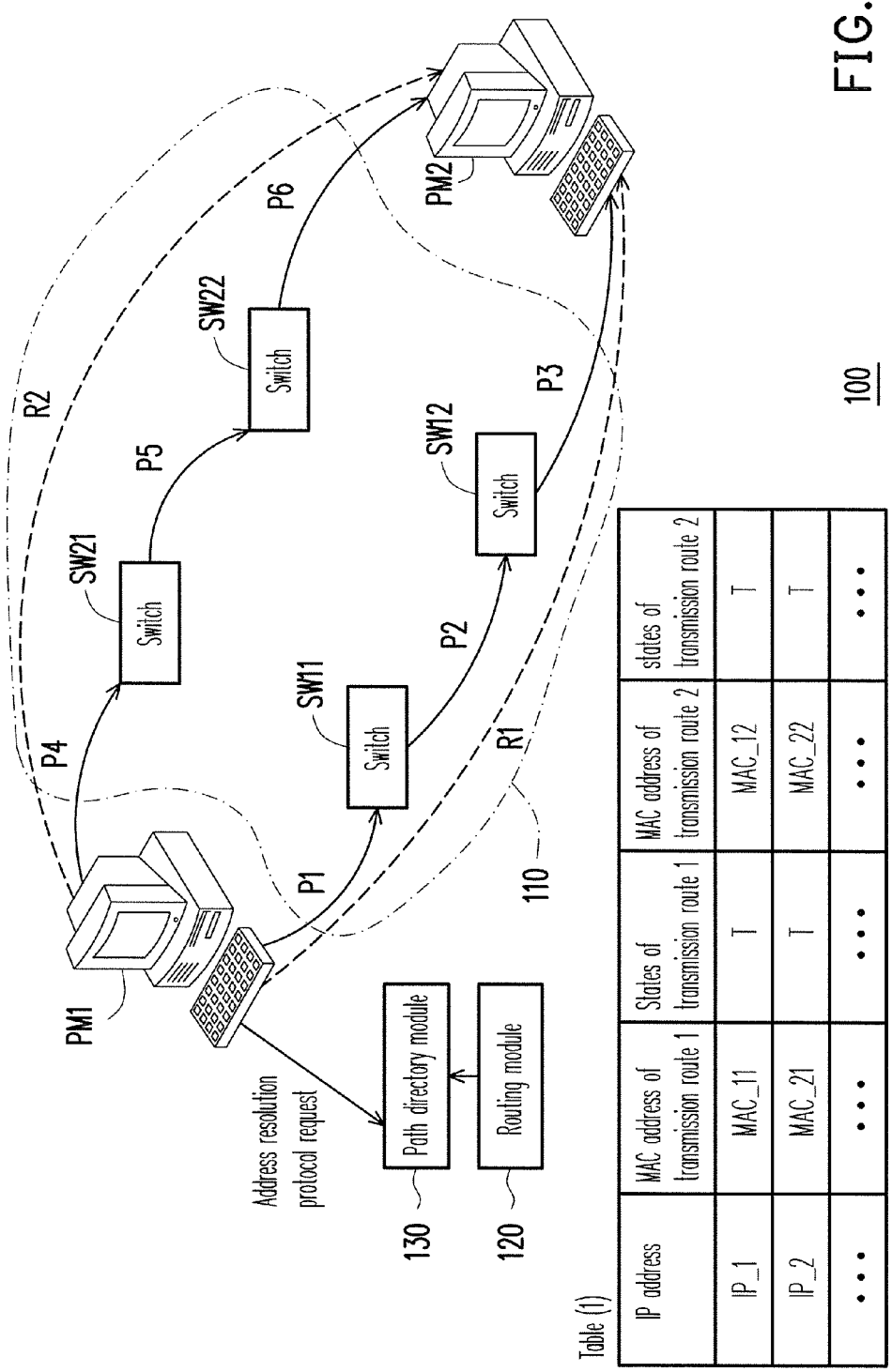
FIG. 2 is a partial schematic diagram illustrating a table of a network system according to the first exemplary embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram illustrating a network system 100 according to a first exemplary embodiment of the disclosure. Referring to FIG. 1, the network system 100 can serve as a data center network composed of physical machines PM and virtual machines VM therein, though the network system 110 can also be applied to other types of network structures according to an actual design requirement. The network system 100 includes a network 110, the physical machines PM, a routing module 120 and a path directory module 130. In the present exemplary embodiment, network equipments (for example, switches SW, though the disclosure is not limited thereto) of layer 2 are used to construct the network 110 of a tree topology (a shape of the topology of the present exemplary embodiment is not limited thereto), and the network 110 has an uplink for performing data transmission with other network systems.

Each of the physical machines PM of FIG. 1 can be regarded as a different physical server, which may include one or a plurality of virtual machines VM based on provided services, and a number of the virtual machines VM included in each of the physical machines PM can be determined according to an actual application requirement. Each of the virtual machines VM has an Internet protocol (IP) address and N media access control (MAC) addresses, so as to connect the switches SW in the network 110 through N transmission routes TR, wherein N is a positive integer and N>1. For example, as shown in FIG. 1, each of the physical machines PM has 4 transmission routes TR (i.e. N=4, though the disclosure is not limited thereto) for connecting the network 110, so that the virtual machine VM therein also has 4 transmission routes TR at most for connecting the network 110, and each of the transmission routes TR corresponds to one MAC address for data transmission.

In the present exemplary embodiment, the routing module 120 is implemented as a routing server of layer 2. The routing module 120 is connected to all of the switches SW in the network 110, so that it can detect and calculate transmission status and connecting states (including transmission states between the switches SW and between the switches SW and the physical machines PM) of all of the transmission routes TR in the network system 100, so as unitedly calculate packet transmission routes of each of the virtual machines VM and dynamically adjust the states of all of the transmission routes TR. According to the above descriptions, those skilled in the art can deduce an implementation method of the routing module 120 by themselves, which is not repeated herein. The path directory module 130 is implemented as a directory server, which records the IP address and the corresponding N MAC addresses of each of the virtual machines VM and a calculation result of the routing module 120, and records such information in a path table.

A key point of the present exemplary embodiment of the disclosure is as follows. Under a premise that the virtual machines VM do not present address resolution protocol (ARP) requests through broadcasting, the ARP requests of all of the virtual machines VM are intercepted and redirected to the path directory module 130. The path directory module 130 is used to process the ARP requests of all of the virtual machines VM in centralization, so as to implement a function of the ARP and avoid network congestion.

On the other hand, the path directory module 130 replies N MAC addresses corresponding to an IP address of a destination virtual machine and states of the transmission routes corresponding to the N MAC addresses in an ARP response, so that the virtual machine VM may have choices of multiple transmission routes. Moreover, when the states of the transmission routes are changed (for example, the transmission route is interrupted or overloaded, though the disclosure is not limited thereto), the path directory module 130 can actively notify the virtual machine VM to update the states of the transmission routes, so that the virtual machine VM can immediately use an alternate route when a currently used transmission route is interrupted or is excessively congested, so as to continue data transmission without re-performing the address resolution operation.

Figure 3:
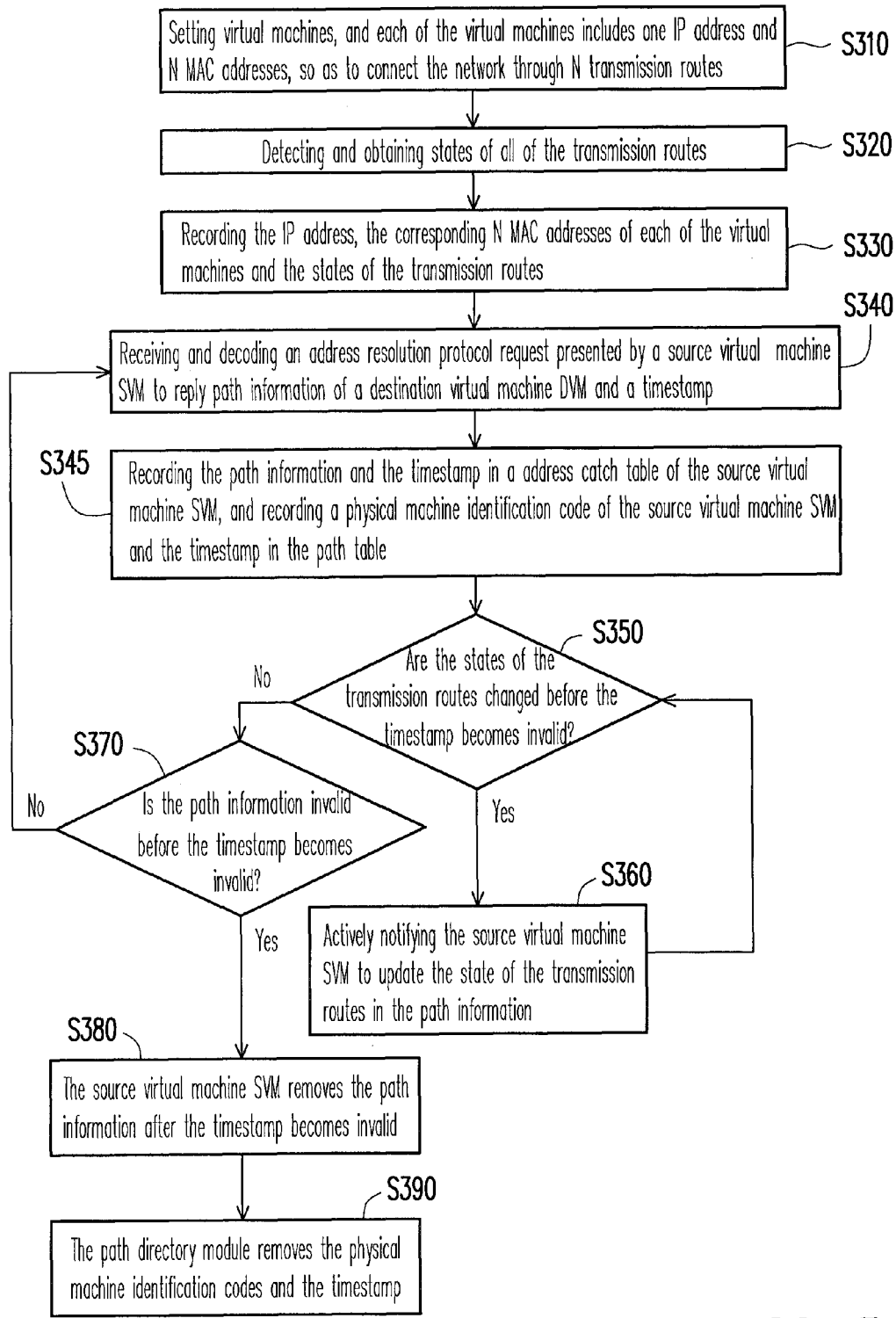
FIG. 3 is a flowchart illustrating an address resolution method according to the first exemplary embodiment of the disclosure.

Furthermore, referring to FIG. 2 and FIG. 3, FIG. 2 is a partial schematic diagram of the network system 100 according to the first exemplary embodiment of the disclosure, and FIG. 3 is a flowchart illustrating an address resolution method according to the first exemplary embodiment of the disclosure. For simplicity's sake, only physical machines PM1 and PM2, switches SW11-SW22 in the network 110, the routing module 120 and the path directory module 130 are illustrated in FIG. 2.

Referring to FIG. 2 and FIG. 3, in step S310, the network system 100 first sets a source virtual machine SVM located in the physical machine PM1 and a destination virtual machine DVM located in the physical machine PM2. The virtual machine SVM includes one IP address IP_1 and two MAC addresses MAC_11, MAC_12. The virtual machine DVM also includes one IP address IP_2 and two MAC addresses MAC_21, MAC_22. Thus, the virtual machines SVM and DVM connect the network 110 through two different transmission routes R1 and R2 (i.e. N=2). It should be known by those skilled in the art that although a situation that each of the virtual machines has two transmission routes and two corresponding MAC addresses is taken as an example in the present exemplary embodiment, it can be deduced that each of the virtual machines may also have a plurality of transmission routes, which is not limited by the disclosure. According to FIG. 2, it is known that when the source virtual machine SVM transmits data packets to the destination virtual machine DVM, the data packets can be transmitted through the transmission route R1 (transmission route R1 is transmission paths P1~P3 through the switches SW11 and SW12) or through the transmission route R2 (transmission route R2 is transmission paths P4, P5 and P6 through the switches SW21 and SW22).

Especially, each virtual machine VM (e.g., the source virtual machine SVM and the destination virtual machine DVM) has an address catch table, which stored IP addresses and corresponding MAC addresses of other known or communicated virtual machines VM. In other embodiments, virtual machine VM also obtains IP addresses and corresponding MAC addresses of specific virtual machines VM with common services by path directory module 130. In order to illustrate present embodiment, it is assuming that the source virtual machine SVM only knows the IP address of the destination virtual machine DVM without MAC addresses thereof, so that the source virtual machine SVM needs to obtain the MAC addresses of the destination virtual machine DVM by using address resolution protocol and path directory module 130.

Then, in step S320, the routing module 120 uses all of the switches SW11-SW22 of the network 110 to detect transmission status of each of the transmission paths P1-P6, so as to obtain the states of all of the transmission routes R1-R2. Then, in step S330, the network system 100 records the IP addresses IP_1-IP_2, the MAC addresses MAC_11-MAC_22 of all of the virtual machines and the states of the transmission routes R1-R2 in the path directory module 130, so as to establish a path table of a data structure (shown by a table (1) in FIG. 2).

In the path table, the MAC addresses and the states of the transmission routes corresponding to the IP address are all referred to as path information of the IP address, for example, in the table (1), (MAC_21, T, MAC_22, T) corresponding to an IP address field "IP_2" are all referred to as the path information of the IP address IP_2 for simplicity's sake. Especially, "T" in a route state field of the table (1) represents that the corresponding transmission route R1 or R2 is in a connecting state, while "F" represents that the corresponding transmission route R1 or R2 is in a disconnecting state. In this way, the path directory module 130 records the IP addresses and the corresponding path information of all of the virtual machines in the path table, so as to complete preparation for the address resolution operation.

When the source virtual machine SVM (which is located in the physical machine PM1) is about to transmit a data packet to the destination virtual machine DVM (which is located in the physical machine PM2), and if an address catch table of the source virtual machine SVM does not contain the path information of the IP address IP_2 of the destination virtual machine DVM, the source virtual machine SVM sends the ARP request to the path directory module 130. The ARP request may include the IP address IP2 of the destination virtual machine DVM or other information that can be used for looking up the path table in the path directory module 130. In the present embodiment, it is not limited to only use the IP address to look up the path table, and information such as an identification code of the destination virtual machine DVM can also be used for table look up, which is not limited by the disclosure.

Then, in step S340, the path directory module 130 receives and decodes the ARP request of the source virtual machine SVM, and uses the IP address IP_2 to look up the path table (i.e. the table (1)), so as to obtain and reply the path information of the IP address IP_2 to the source virtual machine SVM. On the other hand, since the path information in the address catch table of the source virtual machine SVM is required to be in accordance with the path information in the path table of the path directory module 130, though the path information in the path table is dynamically changed along with the states of the transmission routes, in the present exemplary embodiment, a timestamp is used to accord the path information.

In detail, in the step S340, the timestamp (in the present exemplary embodiment, the timestamp is set to 3 seconds, though the disclosure is not limited thereto) is transmitted to the source virtual machine SVM together with the path information of the IP address IP_2. A time length of the timestamp can be set through intercoordination of the path directory module 130 and the source virtual machine SVM, or can be set by the path directory module 130 according to stability of the transmission routes or service items provided by the source virtual machine SVM, etc., which is not limited by the disclosure.

Then, referring to FIG. 3 and FIG. 4, FIG. 4 is a schematic diagram illustrating tables obtained after the address resolution between the source virtual machine SVM and the path directory module 130. In step S350, the source virtual machine SVM records the timestamp and the path information of the IP address IP_2 in the ARP response in the address catch table (shown by a table (2) of FIG. 4). On the other hand, the path directory module 130 records an identification code of the physical machine PM1 corresponding to the source virtual machine SVM and the timestamp in the path table (shown by a table (3) of FIG. 4) in a field extension approach, so as to learn the virtual machines VM within a valid time of the timestamp.

In this way, within the valid time (i.e. within 3 seconds) of the timestamp, if the states of the transmission routes R1-R2 are not changed, and the path information is valid, the source virtual machine SVM can transmit the data packet to the destination virtual machine DVM. Comparatively, before the timestamp becomes invalid, if the states of the transmission routes R1-R2 are changed (for example, the transmission paths P2 are interrupted), a step S360 is executed after the step S350, by which the path directory module 130 actively notify the changed states to the source virtual machine SVM according to the calculation result of the routing module 120, so as to dynamically update the states of the transmission routes in the path information.

Figure 5:
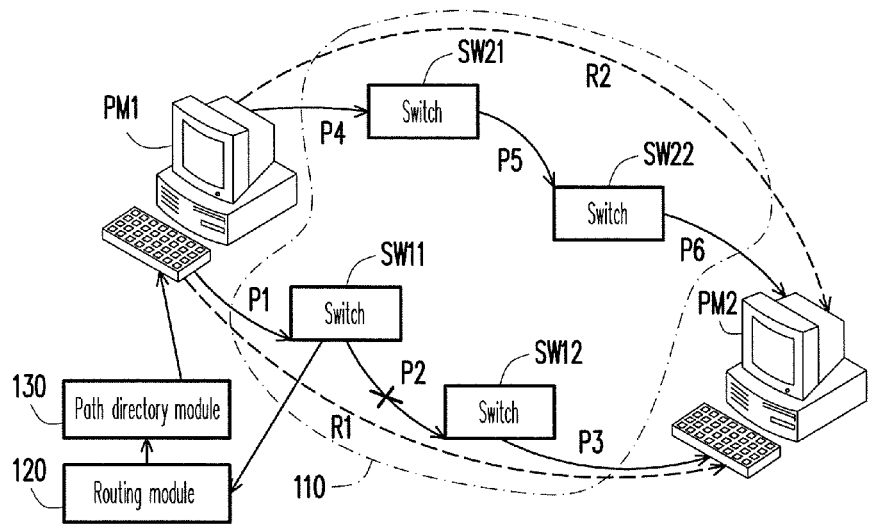
FIG. 5 is a schematic diagram illustrating tables obtained when a transmission path P2 is interrupted.

The step S360 is described in detail below. FIG. 5 is a schematic diagram illustrating tables obtained when the transmission path P2 is interrupted. As shown in FIG. 5, when the transmission path P2 is interrupted, the switch SW11 immediately notifies the routing module 120. The routing module 120 can learn that once the transmission path P2 is interrupted, the transmission routes R1 is accordingly interrupted according to its internal routing operation method, so that the path information of the transmission routes R1 and R2 are all invalid. Therefore, the routing module 120 notifies the interruption information of the transmission routes R1 to the path directory module 130, so as to update the path table (a table (5) shown in FIG. 5) of the path directory module 130. In other words, while the path information described above are invalid, the routing module 120 marks the state field of the transmission route R1 from "T" (connecting state in the table (1) of the FIG. 4) turned into "F" (disconnecting state in the table (5) of the FIG. 5).

Then, the path directory module 130 uses the physical machine PM1 identification code in a physical machine identification code field extended at the back of the path table to actively notify the source virtual machine SVM in the physical machine PM1, so that the source virtual machine SVM updates its address catch table from the table (2) of FIG. 4 to a table (4) of FIG. 5. In this way, the source virtual machine SVM can immediately use another MAC address MAC_22 and the transmission routes R2 thereof to continue the data transmission without re-performing the address resolution operation.

In other embodiments, while the transmission routes R1 is repaired from disconnecting state into connecting state, the path information of the transmission route R1 becomes valid from invalid. Therefore, the routing module 120 notifies the connecting state of the transmission routes R1 to the path directory module 130, so as to actively notify the source virtual machine SVM in the physical machine PM1, so that the source virtual machine SVM updates its address catch table. Thus, the source virtual machine SVM can select the best transmission path to the destination virtual machine DVM between the transmission routes R1 and R2.

On the other hand, referring the step S370 of FIG. 3, within the valid time of the timestamp, the path information received by the source virtual machine SVM can be error (which is also referred to as invalid path information) due to virtual machine migration of the destination virtual machine DVM or other factors, so that the data packet cannot be correctly sent to the destination virtual machine DVM. Therefore, when the path information becomes invalid before the timestamp is invalid, the step S340 is repeated to re-perform the address resolution operation.

When the timestamp becomes invalid, and the states of the transmission routes R1-R2 are not changed, and in case that the path information is valid, a step S380 is executed after the steps S350 and S370, by which the source virtual machine SVM deletes the path information of the IP address IP_2 in the address catch table, and in step S390, the path directory module 130 also deletes the physical machine identification code and the invalid timestamp located at the back of the path table. In this way, if the source virtual machine SVM continues the data transmission, the address resolution operation is required to be re-performed, so as to accord the path information in the address catch table and the path table.

In the present exemplary embodiment of the disclosure, the routing module 120 is not necessarily to adjust the states of the transmission routes only according to whether the transmission paths are interrupted, but can also dynamically adjust the states of the transmission routes according to connection loads of the transmission paths. In other embodiments, when the connection load of the transmission path is greater than a load threshold, the routing module 120 can mark the state of the transmission route including such transmission path as a disconnecting state, and the path directory module 130 accordingly notifies the virtual machine VM, so that the virtual machine VM can use another transmission route to transmit data, so as to achieve a function of load balance recalculation.

Moreover since the source virtual machine SVM deletes the path information after the timestamp becomes invalid, if a time required for transmitting data is greater than the timestamp, the virtual machine is required to re-perform the address resolution operation. When the source virtual machine SVM again presents the same ARP request after a last timestamp is ended, the path directory module 130 prolongs the valid time of a next timestamp (in the present exemplary embodiment, the path directory module 130 doubles the valid time of the timestamp, though the disclosure is not limited thereto), so as to increase effectiveness of the path information.

Comparatively, when the path information becomes invalid (due to virtual machine migration of the destination virtual machine DVM in the present exemplary embodiment) before the last timestamp is ended, and the source virtual machine SVM again presents the same ARP request (i.e. from the step S370 to the step S340 of FIG. 3), it represents that the destination virtual machine DVM has a high change to be migrated, so that the path directory module 130 shortens the valid time of the next timestamp (in the present exemplary embodiment, the path directory module 130 shortens the valid time of the timestamp by a half, though the disclosure is not limited thereto), so as to continually update the path information.

Figure 6:
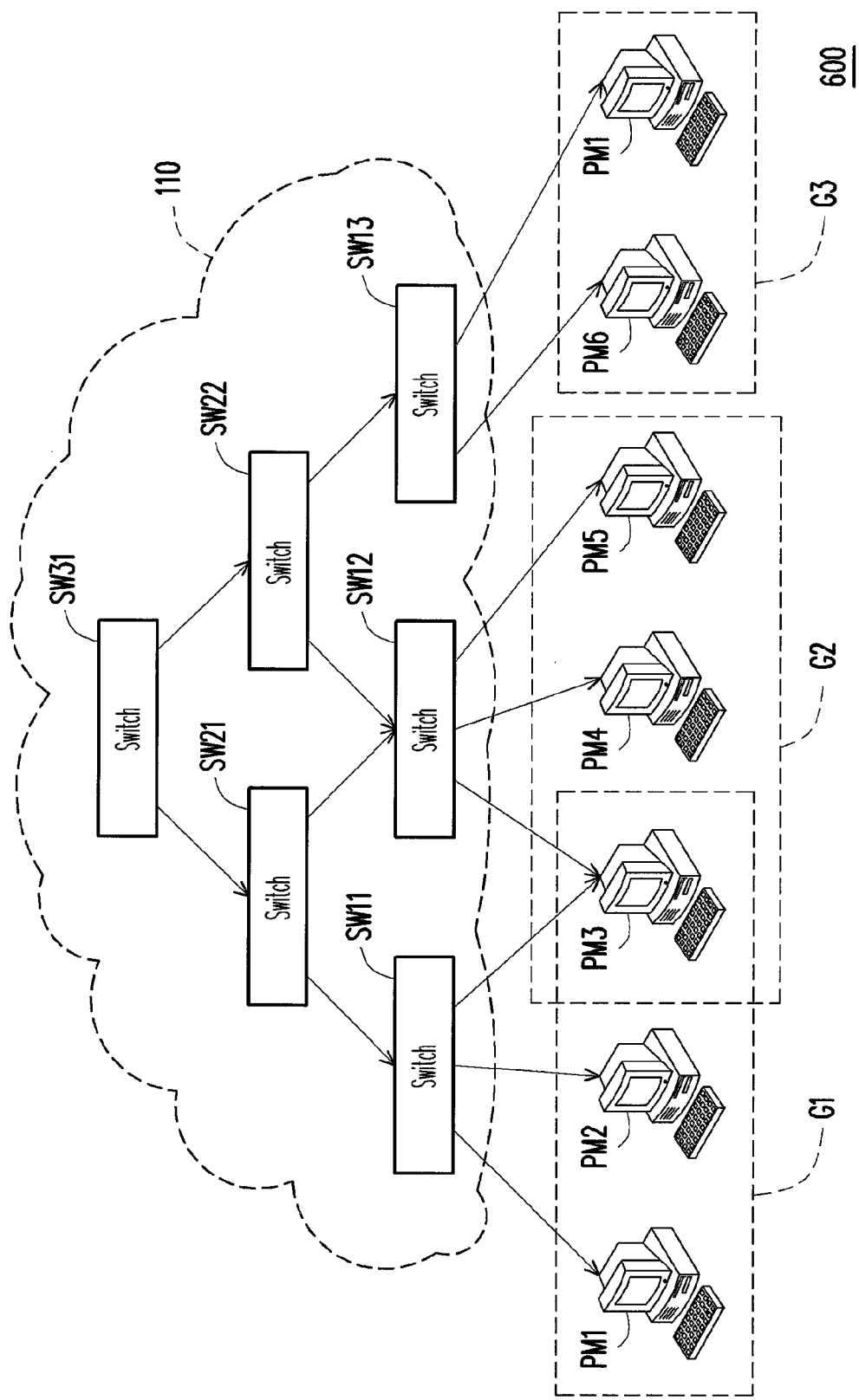
FIG. 6 is a partial schematic diagram illustrating a network system according to a second exemplary embodiment of the disclosure.

Moreover, since the path table of the path directory module 130 has to record the physical machine identification codes of all of the virtual machines within the valid time of the timestamp in the back of the path table, the link list data structure can be used to implement the fields extended at the back of the path table in the present exemplary embodiment. However, there are two drawbacks for the link list data structure. One is when time goes by, the number of physical machine identification codes to be recorded in the data structure will grow larger and larger, so that the extend fields will grow larger and larger too. In a data center network for millions of virtual machines, this link list data structure will grow too huge to fit in server memory (in the present exemplary embodiment, at most 20 sets of fields are extended at the back of the path table, though the disclosure is not limited thereto), as shown in FIG. 6 and a table (6) of FIG. 7, FIG. 6 is a partial schematic diagram illustrating a network system 600 according to a second exemplary embodiment of the disclosure, and FIG. 7 a diagram illustrating path tables of the network system according to the second exemplary embodiment of the disclosure. Another drawback is when one of the transmission routes is invalid, path directory module 130 needs to inform all the physical machines that are recorded in the extended fields individually. This action needs a lot of time and wastes a lot bandwidth of the data center network.

In the present embodiment of the disclosure, physical machines under a same switch are grouped in a same group (for example, physical machines PM1-PM3 under a switch SW11 are grouped in a group G1, physical machines PM3-PM5 under a switch SW12 are grouped in a group G2, and physical machines PM6-PM7 under a switch SW13 are grouped in a group G3). Then, the patch directory module 130 combines the extended fields at the back of the path table (shown as the table (6) and a table (7) of FIG. 7), by which the physical machine identification codes in a same row and in a same group are replaced by an IP address of the switch corresponding to this group, for example, the identification codes of the physical machines PM1 and PM2 of the table (6) are combined as the IP address of the switch SW11 of the table (7), and the identification codes of the physical machines PM3 and PM4 of the table (6) are combined as the IP address of the switch SW12 of the table (7). In this way, the path directory module 130 can use the switches SW11 and SW12 to broadcast to the physical machines PM1-PM3 and PM3-PM5 there under, so as to actively notify the virtual machines to update the states of the transmission routes. Other details of the present exemplary embodiment are similar as that described in the aforementioned embodiment, so that detailed descriptions thereof are not repeated.

In summary, the path directory module 130 is used to the process ARP requests of all of the virtual machines in centralization, so as to implement a function of the ARP and avoid network congestion. On the other hand, the path directory module 130 can actively notify the virtual machine VM to update the states of the transmission routes, so that the virtual machine VM can immediately use an alternate route when a currently used transmission route is interrupted or excessively congested, so as to continue data transmission without re-performing the address resolution operation.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A network system, comprising:
 a network;
 a plurality of virtual machines, each of the virtual machines comprising an Internet protocol (IP) address and N media access control (MAC) addresses, so as to connect the network through N transmission routes, wherein N is a positive integer and N>1;
 a routing module, for detecting and calculating states of the transmission routes; and
 a path directory server, for recording the IP address and the N MAC addresses of each of the virtual machines and a calculation result of the routing module, and receiving and decoding an address resolution protocol (ARP) request presented by at least one source virtual machine to reply path information, wherein the path information comprises N MAC addresses corresponding to the IP address of a destination virtual machine and states of the N transmission routes, the at least one source virtual machine is one of the virtual machines, and the destination virtual machine is another one of the virtual machines, wherein,
 the path directory server transmits a timestamp to each of the at least one source virtual machine when replying the path information, wherein the at least one source virtual machine removes the path information after the timestamp becomes invalid,
 wherein the path directory server records a physical machine identification code corresponding to each of the at least one source virtual machine and the corresponding timestamp, and removes the physical machine identification code and the corresponding timestamp after the timestamp becomes invalid,
 wherein when the states of the transmission routes are changed and the timestamp is still valid, the path directory server actively notifies each of the at least one source virtual machine to update the states of the N transmission routes in the path information.

2. The network system as claimed in claim 1, wherein the routing module detects transmission status of the transmission routes to dynamically adjust the states of the transmission routes.

3. The network system as claimed in claim 2, wherein the routing module marks the states of the transmission routes with failed connections as disconnecting states, and marks the states of the transmission routes with successful connections as connecting states.

4. The network system as claimed in claim 2, wherein the routing module marks the states of the transmission routes with connection loads greater than a threshold as disconnecting states, and marks the states of the transmission routes with connection loads smaller than the threshold as connecting states.

5. The network system as claimed in claim 2, wherein the routing module marks the states of the transmission routes corresponding to the path information as disconnecting states when the path information is invalid.

6. The network system as claimed in claim 1, wherein when the at least one source virtual machine again presents the ARP request after a last timestamp is ended, the path directory server prolongs a valid time of a next timestamp.

7. The network system as claimed in claim 1, wherein when the path information becomes invalid before a last timestamp is ended, and the at least one source virtual machine again presents the ARP request, the path directory server shortens a valid time of a next timestamp.

8. The network system as claimed in claim 1, wherein the network further comprises a plurality of switches, and the virtual machines under a same switch are grouped into a same group, and the path directory server records an IP address of the same switch corresponding to the same group of the virtual machines to replace the physical machine identification code of the at least one source virtual machine of the same group, so that the same switch broadcasts and updates the states of the N transmission routes in the path information to the virtual machines of the same group.

9. The network system as claimed in claim 1, wherein each of the virtual machines has an address catch table, for storing the IP addresses and the corresponding MAC addresses of other known or communicated virtual machines.

10. A method of address resolution, comprising:
 setting a plurality of virtual machines, wherein each of the virtual machines comprises an Internet protocol (IP) address and N media access control (MAC) addresses, so as to connect a network through N transmission routes, N is a positive integer and N>1;
 detecting and obtaining states of the transmission routes;
 recording the IP address, the corresponding N MAC addresses of each of the virtual machines and the states of the transmission routes;
 receiving and decoding an address resolution protocol (ARP) request presented by at least one source virtual machine to reply path information, wherein the path information includes N MAC addresses corresponding to the IP address of a destination virtual machine and states of the N transmission routes, the at least one source virtual machine is one of the virtual machines, and the destination virtual machine is another one of the virtual machines;
 transmitting a timestamp to each of the at least one source virtual machine when replying the path information, wherein the at least one source virtual machine removes the path information after the timestamp becomes invalid;
 recording a physical machine identification code corresponding to each of the at least one source virtual machine and the corresponding timestamp, and removing the physical machine identification code and the corresponding timestamp after the timestamp becomes invalid; and
 when the states of the transmission routes are changed and the timestamp is still valid, actively notifying and updating the states of the N transmission routes in the path information.

11. The method of address resolution as claimed in claim 10, wherein the step of detecting and obtaining the states of the transmission routes comprises:
 detecting transmission status of the transmission routes to dynamically adjust the states of the transmission routes.

12. The method of address resolution as claimed in claim 11, wherein the step of dynamically adjusting the states of the transmission routes comprises:
 marking the states of the transmission routes with failed connections as disconnecting states, and marking the states of the transmission routes with successful connections as connecting states.

13. The method of address resolution as claimed in claim 11, wherein the step of dynamically adjusting the states of the transmission routes comprises:
 marking the states of the transmission routes with connection loads greater than a threshold as disconnecting states, and marking the states of the transmission routes with connection loads smaller than the threshold as connecting states.

14. The method of address resolution as claimed in claim 11, wherein step of dynamically adjusting the states of the transmission routes comprises:
   marking the states of the transmission routes corresponding to the path information as disconnecting states when the path information is invalid.

15. The method of address resolution as claimed in claim 10, further comprising:
   prolonging a valid time of a next timestamp when the at least one source virtual machine again presents the ARP request after a last timestamp is ended.

16. The method of address resolution as claimed in claim 10, further comprising:
   shortening a valid time of a next timestamp when the path information becomes invalid before a last timestamp is ended and the at least one source virtual machine again presents the ARP request.

17. The method of address resolution as claimed in claim 10, wherein the network further comprises a plurality of switches, and the virtual machines under a same switch are grouped into a same group, and an IP address of the same switch corresponding to the same group of the virtual machines is recorded to replace the physical machine identification code of the at least one source virtual machine of the same group, so that the same switch broadcasts and updates the states of the N transmission routes in the path information to the virtual machines of the same group.

18. The method of address resolution as claimed in claim 10, wherein each of the virtual machines has an address catch table, for storing the IP addresses and the corresponding MAC addresses of other known or communicated virtual machines.

19. A network system, comprising:
   a network;
   a plurality of virtual machines, each of the virtual machines comprising an Internet protocol (IP) address and N media access control (MAC) addresses, so as to connect the network through N transmission routes, wherein N is a positive integer and N>1;
   a plurality of switches in the network, wherein the virtual machines under a same switch are grouped into a same group;
   a routing module, for detecting and calculating states of the transmission routes; and
   a path directory server, for receiving and decoding an address resolution protocol request presented by at least one source virtual machine to reply path information, wherein the path information comprises N MAC addresses corresponding to the IP address of a destination virtual machine and states of the N transmission routes, wherein,
   when the at least one source virtual machine are in the same group, the path directory server records an IP address of the same switch in correspondence with the same group, to replace the physical machine identification code of the at least one source virtual machine in the same group, wherein,
   the path directory server records a physical machine identification code corresponding to the at least one source virtual machine and a corresponding timestamp, and transmits the timestamp to each of the at least one source virtual machine when replying the path information, wherein each of the at least one source virtual machine removes the path information and the path directory server removes the physical machine identification code and the corresponding timestamp after the timestamp becomes invalid,
   wherein when the states of the transmission routes are changed and the timestamp is still valid, the path directory server actively notifies the switch corresponding to the timestamp to update the path information of the at least one source virtual machine of the same group corresponding to the same switch.

* * * * *